Feb. 1, 1927.

O. WERNER 1,616,157

INTERNAL COMBUSTION ENGINE

Filed Feb. 15, 1923    3 Sheets-Sheet 1

Inventor:
Oscar Werner,
By James T. Barkelew
his Attorney

Feb. 1, 1927.
O. WERNER
1,616,157
INTERNAL COMBUSTION ENGINE
Filed Feb. 15, 1923   3 Sheets-Sheet 2

Inventor:
Oscar Werner,
By James T. Barkelew
his Attorney

Patented Feb. 1, 1927.

1,616,157

UNITED STATES PATENT OFFICE.

OSCAR WERNER, OF BRIDGEPORT, CONNECTICUT.

INTERNAL-COMBUSTION ENGINE.

Application filed February 15, 1923. Serial No. 620,262.

This invention relates to an internal combustion engine of the type provided with an ignition chamber or retort wherein is adapted to be created an initial explosion the flaming gases of which are adapted to enter a combustion chamber to there ignite and cause to be burned fuel deposited in said combustion chamber.

It is an object of the invention to provide an engine of the present character having novel mechanism whereby fuel can be admitted to its combustion chamber at the time of, before, and after initial ignition in a retort associated with said combination chamber so that the fuel that is admitted at the time of or before said initial ignition may burn at substantially constant volume, as in the Otto cycle, and that admitted after said initial ignition may burn at substantially constant pressure, as in the Diesel cycle, and to provide an interrelated and communicating combustion chamber and ignition chamber or retort so constructed, and arranged with respect to each other, that the ignition and burning of the fuel in the combustion chamber will be certain and accurate no matter whether the admission or injection of the fuel to said combustion chamber is at the time of, before, or after the ignition of the fuel in the ignition chamber or retort and its propagation into the combustion chamber.

To the accomplishment of this object accurate and effective controls for the admission or injection of fuel, including controls for a total amount, its timing, and the proportioning of the amounts introduced before and after initial ignition, are provided. The control for said proportioning of the amounts of course controls the proportionate amounts of fuel burned at constant volume and at constant pressure, and in this connection I may also state that I preferably provide my control means in such a manner that, the various controls having been once set to suit the particular type of engine, its average power output, etc., the variations in the output are then controlled by varying the amount of fuel burned at constant pressure without varying the amount burned in constant volume.

There are various other objects and corresponding advantages and accomplishments of the invention which will become apparent from the full description of the structure and operation of a specific form of engine in which the features of the invention are incorporated now to be made, it being understood that the disclosure herein is merely illustrative and meant in no way in a limiting sense, changes in details of construction and arrangement of parts being permissible so long as within the spirit of the invention and the scope of the appended claims.

Figures 1, 2, 3, 4, 5, 11:
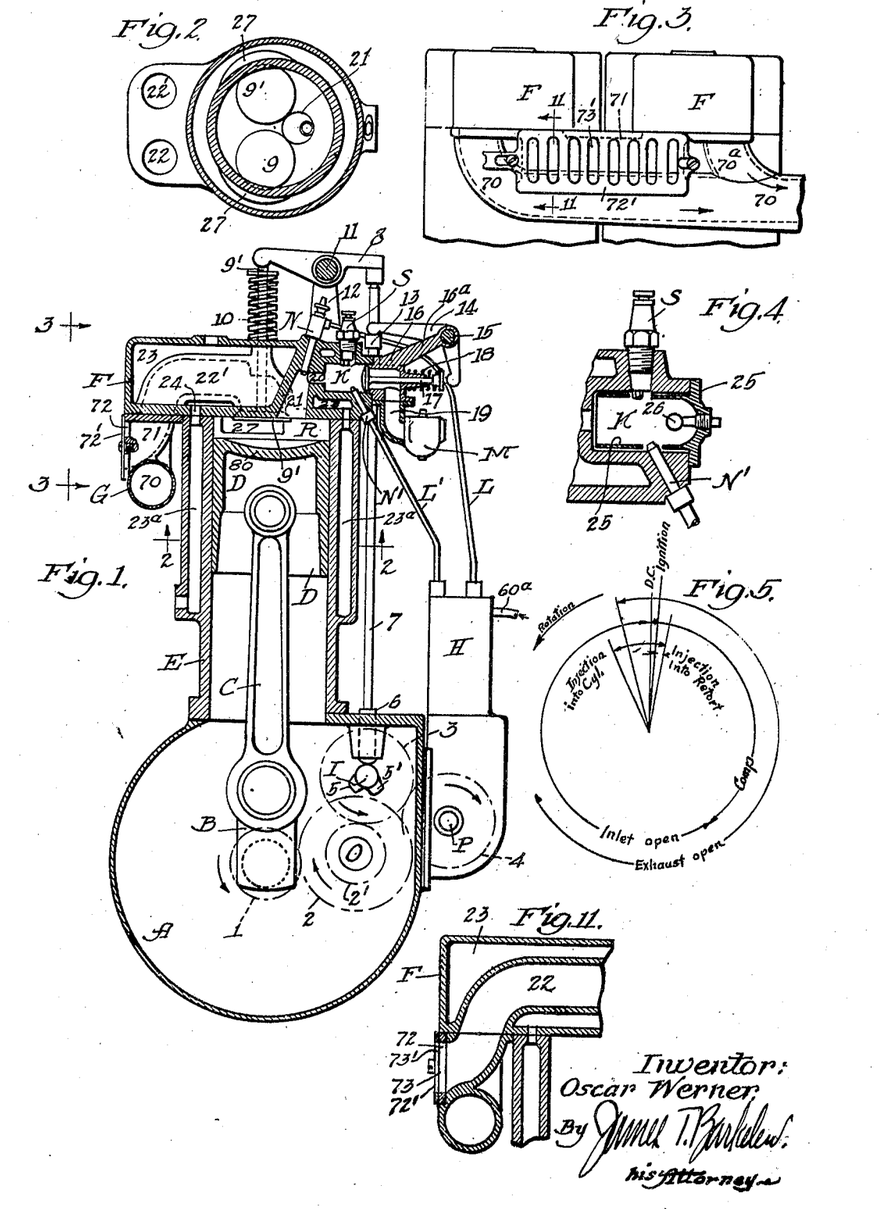
Fig. 1 shows a vertical section of a preferred construction of the engine.
Fig. 2 shows a horizontal section on line 2—2 of Fig. 1 with manifold and various other parts removed.
Fig. 3 shows a side view of the manifold attached to a two cylinder engine.
Fig. 4 is a detail section showing a modified form of retort.
Fig. 5 shows a typical valve opening, fuel injection and ignition timing diagram based on the angular travel of the crankshaft.
Fig. 11 is a detail section on line 11—11 of Fig. 3.

A denotes the crankcase, B the crankshaft, C the connecting rod, D the piston, E the cylinder, F the cylinder head, G the inlet and exhaust manifold, H the fuel pump, I the camshaft, K the retort, N the main fuel nozzle, N' the auxiliary fuel nozzle, L the fuel lead from pump H to nozzle N, L' the fuel lead from pump H to auxiliary nozzle N', M the auxiliary carbureter. Camshaft I is driven through gear 1, mounted on the crankshaft B, idler gears 2 and 2' mounted on idler pinion O and gear 3, mounted on camshaft I in such a way as to rotate at one half crankshaft speed. Fuel pump H is bolted to crankcase A and driven at camshaft speed through gear 4, mounted on fuel pump shaft P and engaging with gear 3. On camshaft I is mounted cam 5 which through tappet 6, pushrod 7, and valve rocker 8 operates main inlet valve 9; the exhaust valve 9' being operated by a like mechanism from cam 5'. Valve spring 10 has the usual function. Rockerarm 8 oscillates around shaft 11 which is supported by uprights 12 mounted on cylinder head F.

The pushrod 7 operating the inlet valves carries adjustable block 13 which operates offset bellcrank 14 carried by pin 15 mounted on an extension 16ª of auxiliary inlet valve cage 16. Bell crank 14 opens valve 17 against pressure of the valve spring 18. Thus auxiliary inlet valve 17 is operated in conjunction with main inlet valve 9, but by allowing an extra amount of clearance between bell crank 14 and valve 17, said valve 17 can be made to open later and close earlier than valve 9. Also by this method the total lift of valve 17 can be decreased. Inlet valve cage 16 communicates through passage 19 with auxiliary carbureter M which is supplied with a fairly volatile fuel such as gasoline or kerosene. (In case of a multi-cylinder engine, one carbureter can be used to supply two or more cylinders.) The engine is shown at the end of its compression stroke with all valves closed. The auxiliary inlet valve 17 opens into retort K into which also opens spark plug S and auxiliary fuel nozzle N'. Spark plug S is connected with a source of igniting current, so timed as to create ignition when the piston reaches the top dead center or just previous thereto. At its other end retort K is in constant communication with compression space R through passage 20 which communicates with the upper end of funnel shaped passage 21. This passage 21 is so located as to point down more or less vertically and to terminate at its lower end more or less centrally with reference to compression space R. Fuel nozzle N is so located that its axis approximately coincides with the axis of passage 21.

Fuel nozzles N and N' may be of any of the various forms commonly used in Diesel or semi-Diesel engines for the purpose of emitting the fuel in a cone or fine spray.

Valves 9 and 9' communicate with manifold G through passages 22 and 22'.

Presuming the use of auxiliary carbureter M (in which case nozzle N' and fuel line L' are not being used) the operation of the engine is now as follows:

During the suction stroke of the engine valves 9 and 17 are held open by cam 5 and connecting linkage 6, 7, 8, 13 and 14. The piston D being on its downward stroke will suck pure air through manifold G and passage 22 past valve 9 into compression space R. At the same time there will enter a small amount of carburetted mixture from carbureter M through passage 19 and past valve 17 into retort K, by reason of the vacuum existing within the cylinder being communicated to the retort through passages 20 and 21.

On the compression stroke all valves being closed, the air in compression space R will be compressed to the desired pressure and this pressure will be communicated through passages 21 and 20 to retort K compressing the carburetted mixture therein to substantially the same pressure that exists within the cylinder.

Shortly before the piston reaches the top center of its stroke (about 10° previous thereto) fuel injection will begin and fuel will be sprayed from nozzle N in a fine continuous spray into channel 21 and into space R and toward the head of piston D. The piston head may be utilized for promoting the vaporizing of the fuel either by actual contact with the fuel spray or by heat radiation. The spray entering the main cylinder will mix with the compressed air present there and form a mixture too lean to be ignitible by ordinary means. The mixture, however, will be quite rich within passage 21 where the fuel spray was well confined. Just before the piston reaches upper dead center (in practice about 5° previous thereto), spark plug S will ignite the carburetted mixture in retort K. Due to the turbulence set up therein by the jet of compressed air that has rushed into the retort during the compression stroke through comparatively small passage 20, a very rapid and violent explosion will follow. The flaming gases will rush from the retort through passages 20 and 21 into space R with great force and set up within space R a violent turbulence. They will encounter on their way and ignite the comparatively rich heavy fuel mixture within passage 21, (the injection of heavy fuel going on uninterruptedly at this time), and their combined heat will raise the temperature within combustion chamber R sufficiently to readily ignite the lean fuel mixture encountered there. Up to this point the combustion proceeds at constant volume as in the Otto cycle, but due to the average leanness of the mixture the ratio of the pressure rise within combustion chamber R will be much less than in the Otto cycle. Also on account of the average leanness of the mixture the likelihood of fuel knock will be overcome.

Thereafter any fuel spray entering from nozzle N upon striking the flaming gases there present within space R will be vaporized and ignited almost instantly and due to the high degree of turbulence then existing within space R they will be thoroughly intermingled with the gases therein, thus increasing the rate of flame propagation and tending towards a clean combustion and the fullest utilization for combustion purposes of the available air. With proper design of the fuel pump the rate of fuel injection is such as to maintain the pressure in the cylinder approximately constant as long as the injection lasts, despite the outward travel of the piston. It will thus be seen that the heavy fuel injected into the cylinder previous to ignition will burn at constant volume, while the heavy fuel injected thereafter will burn at constant pressure as in the Diesel cycle. The proportion between the amount of fuel to be burned at constant volume and the amount of fuel to be burned at constant pressure can be regulated at will and within wide limits by changing the interrelation between the timing of the fuel injection and the timing of the spark.

The output of the engine can be reduced by decreasing the rate of fuel discharge or preferably by cutting off the fuel injection at an earlier point, thereby reducing the amount of fuel burned at constant volume or eliminating it entirely. Any further cutting off of the fuel injection will result in producing a still leaner mixture within the compression space previous to explosion, thereby still further reducing the output of the engine. The nature of this mixture can also be influenced to a certain extent by altering the point of beginning of the fuel injection.

Thereafter, (after fuel injection cutoff) and upon further outward travel of piston D, the gases within the chamber R will expand in the usual manner. Toward the end of the outward stroke, valve 9' is opened through cam 5' and thereafter during the exhaust stroke following the gases will rush through passage 22' into exhaust manifold G in the usual manner.

Figure 10:
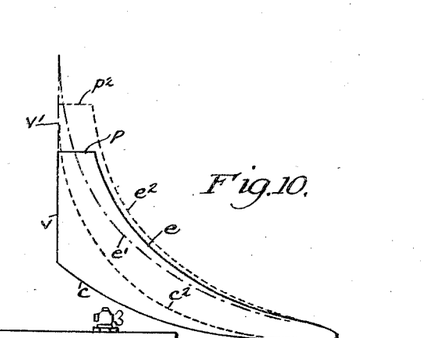
Fig. 10 shows an ideal indicator diagram of the cycle described, compared with indicator diagrams of the Otto cycle and the Diesel cycle.

In Fig. 10 I have shown various superimposed ideal indicator diagrams. The above described cycle follows the solid outline $c, v, p, e$. Outline $c, v, v', e'$, is the indicator card of an Otto cycle using the same compression pressure. Outline $c_2, p_2, e_2$ is the indicator card of the Diesel cycle.

It will be noted that due to the leanness of the mixture at the time of ignition the maximum explosion pressure is considerably less than that of an Otto engine employing the same compression, (the pressure used being 2 to 2.7 to 1 against 3.75 to 1 in the Otto engine). It will also be noted that the maximum pressure is less than in the Diesel cycle, which requires high compression in order to produce a temperature high enough for self-ignition.

Figure 8:
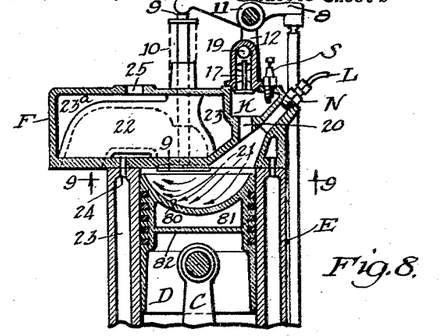
Fig. 8 is a vertical section showing another construction of cylinder head and retort.
Figure 9:
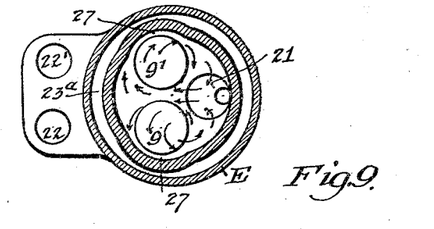
Fig. 9 shows a horizontal section on line 9—9 of Fig. 8.

In Figs. 8 and 9 I show a variation of the arrangement shown in Fig. 1. The outstanding differences in Figs. 8 and 9 are a greater inclination of nozzle N and passage 21 and a widening of the throat of passage 21 so that it is more expansive. In this arrangement the retort K, valve 17, and spark plug S have been somewhat changed in position for convenience of design; they operate the same as hereinbefore described. Also the head 80 of the piston is cupped out more deeply than in Fig. 1; and this, together with the more angular position of passage 21, causes the spray to hit more nearly to the center of the piston and makes the length of the spray, before it hits the piston head, as long as possible. It has been found that not only the width of the spray cone and the relative dispersion of the spray particles, but also the fineness of the spray increases with the distance.

Also the further depression of the piston head, in addition to lengthening the spray distance without increasing the compression space, has the effect of bringing up the sides of the piston so as to practically completely cover the cylinder walls when the piston is in its uppermost position. The spray thus cannot hit the cylinder walls to interfere with cylinder lubrication. It has been found desirable to have the piston hot enough so that any particles of fuel spray not previously nebulized, or vaporized, are evaporated immediately when they hit the piston; and it is at the same time desirable to have the piston head cool enough as to not cause dissociation of the fuel into lampblack and lighter hydrocarbons.

After considerable experimentation and trial, the specific design shown in Fig. 8 has been adapted to accomplish the foregoing desirable features. I also leave the upper surface of head 80 unfinished so as to increase the heat absorption from the hot gases, and I provide a baffle plate 82 (either cast integrally or formed by sheet metal) to form a confined air space 81 and prevent oil splash or air currents from coming into contact with head 80 and carrying off its heat.

In addition to the advantages above set forth, the thermal efficiency of the engine is also increased by cutting down the heat that is lost to the usually uncovered walls, and to the usually comparatively cold type of piston head.

In Figs. 8 and 9 the valves 9 and 9' are set over a little further from the cylinder center so as to allow room for the enlarged passage 21 and to get that passage near to the center.

The explosive mixture within retort K can be produced by various means, for instance; instead of using auxiliary carbureter M, a small portion of fuel can be injected into the retort toward the end of the compression stroke and previous to the desired point of ignition. As set out further below, the auxiliary fuel can be supplied by fuel pump H through lead L' in such a way that at the beginning of injection nozzles N and N' both eject fuel, but that at the desired point the supply of fuel through nozzle N' ceases, all of the fuel going to nozzle N thereafter. Where the fuel is rather heavy a non-cooled sleeve 25 (Fig. 4) may be placed within retort K in order to facilitate by its accumulation of heat the evaporation of the retort fuel, such as shown in Fig. 4. In such case electric plug S which may be a sparking plug as an electrically heated wire may be used for starting only, hot point 26 being relied upon thereafter for ignition and the ignition may be timed by timing the injection of fuel through nozzle N'. Or a separate and distinct fuel pump may be used in order to supply a fixed amount of comparatively light fuel to nozzle N'. In fact, the structure and operation of the fuel pump hereafter described with its various adjustments, is the equivalent, in action, of two separately controllable pumps. The location of nozzle N' may also be altered so as to give the best results.

Where gaseous fuel such as illuminating gas is obtainable a gas mixing valve may be substituted for carbureter M.

Where carbureter M and inlet valve 17 are used the lift of said valve and its period of opening may be decreased as above set forth so as to limit the amount of mixture being inhaled into retort K during the suction stroke of the engine, to such an extent that a substantial amount of burnt gases is allowed to remain within the retort. Thus their admixture with the new charge may be used to overcome any tendency of the retort mixture to detonate. In such case the quality of the carburetted mixture entering past the valve would be enriched correspondingly to supply the required amount of fuel. Or a smaller valve admitting fuel only could be substituted.

An explosive mixture in retort K could also be produced without the use of the crabureter or auxiliary nozzle N' by starting injection through nozzle N at an earlier point in the compression stroke while compressed air is still rushing from the combustion chamber R into retort K, this inrushing air being relied upon to carry sufficient fuel spray into the retort to form an explosive fuel-air mixture therein. For this purpose passage 20 or 21 or both could be made smaller, which would have the effect, that a longer time period would be required until the pressures in space R and retort K are equalized and that particularly in high speed engines this point of equalization would occur later in the compression stroke. Thus the travel of air from the cylinder into retort K (which would be relied upon to carry fuel into the retort) could be maintained until the very point of ignition.

Figure 6:
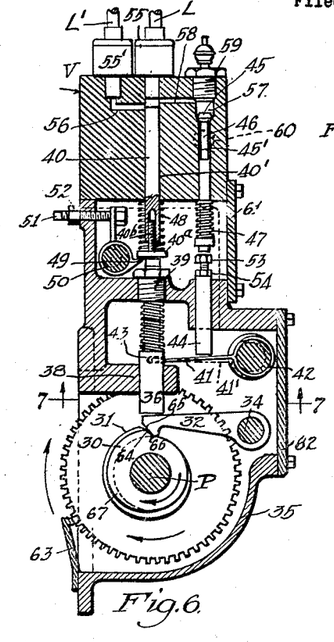
Fig. 6 shows a vertical section through the fuel pump for a one cylinder engine.
Figure 7:
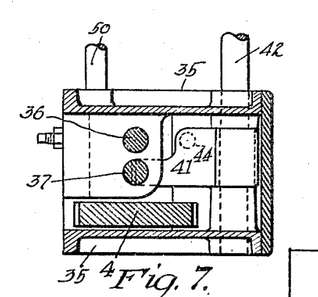
Fig. 7 shows a horizontal section on line 7—7 of Fig. 6.

*Detail description of pump shown in Figs. 6 and 7.*

Shaft P carries gear 4 meshing with the half time gear as above described. It also carries double cam 30—31. The cams actuate cam followers 32 and 32' oscillating around shaft 34 which is fixed at both ends in pump housing 35. The cam followers are held against the cams by spring-actuated plungers 36 and 37 which are guided by holes in projection 38 of housing 35 and by bushings 39 in the upper part of housing 35. Plunger 36 imparts the motion received from follower 32 to fuel plunger 40 sliding in hole 40' in valve cage V. Plunger 37 imparts the motion received from follower 32' to blade 41 oscillating around eccentric shaft 42 mounted in housing 35. The forward end of the blade slides freely in a slot 43 in plunger 37. Against this blade more or less half way between plunger 37 and shaft 42 rests plunger tappet 44 which imparts the motion received from blade 41 to fuel inlet valve 45 upon stem 46 sliding in hole 45' in valve chest V.

It will be readily seen that by turning shaft 42 the fulcrum of its eccentric can be raised or lowered at will, thereby raising or lowering the position of tappet 44. As a further adjustment, adjusting screw 53 and locknut 54 are provided on tappet 44.

Valve 45 is held against its seat by spring 47. Plunger 40 is held by spring 48 against stop 49. This stop is loosely mounted on eccentric shaft 50 supported in housing 35, but is prevented from turning by adjustable stop 51, screwed into housing 35 and secured by locknut 52.

It will be readily seen that by turning shaft 50, the fulcrum of its eccentric can be raised or lowered at will, thereby raising or lowering stop 49 and thus limiting the outward stroke of plunger 40.

Above plunger 40 is mounted check valve 55 being connected by lead L to nozzle N. (See Fig 1.) Check valve 55' being connected by lead L' to nozzle N' communicates with the plunger bore 40' through small passage 56 which enters the plunger bore just above the top of the plunger when in its lowest position. Check valves 55 and 55' may be of any standard design. The plunger bore 40' also communicates with space 57 through passage 58. The upper portion of space 57 is closed off by plug 59, on which may be mounted a pet cock or relief valve. When valve 45 is held open, space 57 communicates past it through hole 45' with longitudinal passage 60 connected to the main fuel supply 60ª.

61 and 62 are inspection plates. 63 is a baffle for the purpose of creating an oil pocket in the lower half of housing 35. The oil contained therein is picked up by gear 4 and splashed against the various parts inside of housing 35, thereby insuring ample lubrication.

The action of the pump is now as follows: Assuming the position shown in Fig. 6 as starting position, a further turning of shaft P in the direction of the arrow will bring the common face 64 of cams 30 and 31 in contact with faces 65 of followers 32 and 32', causing them to rise along face 64 and raising up plungers 36 and 37 respectively. After taking up the clearance between the top of plunger 36 and the bottom of fuel plunger 40 (depending on the position of stop 49) plunger 36 will raise fuel plunger 40 driving the fluid imprisoned above it, (valve 45 being seated at the time), through check valves 55 and 55' and after passage 56 has been overrun by the plunger, through check valve 55 only. At the same time plunger 37 will raise the end of blade 41, which in turn will raise tappet 44. Depending on the angular position of eccentric shaft 42, adjusting screw 53 will come sooner or later into contact with the bottom of valve 45 thereby raising it and opening the valve passage. The result will be that any fluid displaced thereafter by fuel plunger 40 will return past valve 45 into fuel supply line 60 rather than overcome the spring pressure of check valves 55 and 55'.

The eccentric shaft 42 is given such throw that at its highest position there is practically no clearance between screw 53 and the bottom of valve 45 and that valve 45 will thus be opened immediately after follower 32' engages face 64 of the cam; while at its lowest position the clearance between screw 53 and the bottom of valve 45 will be considerable and valve 45 will not open until after follower 32 and plunger 40 have completed their stroke. (It will be noted that while face 64 of both cams coincide, cam 31 operating valve 45 has a higher total lift than cam 30 operating plunger 40.) It will be readily seen that by thus turning shaft 42, all or a portion of the stroke of plunger 44 can be made non-effective and that the injection of fuel can be terminated at will without however affecting the beginning of the injection or the rate thereof.

41' shows the bottom position of blade 41.
In practice shaft 42 may be hand operated or may be connected to the governor of the engine.

It will also be noted that race 64 and faces 65 of followers 32 and 32' are so designed as to maintain a uniform rate of raise of plungers 36 and 37, thus giving a uniform rate of fuel injection and avoiding wire drawing.

Upon further rotation of shaft P, faces 65 will leave face 64 of the cams and thereafter the followers 32 and 32' will ride with their faces 66 on the contour of cams 30 and 31.

The contour of cam 30 returns soon thereafter in the form of a spiral to base circle 67 allowing follower 32 and plungers 36 and 40 to return to their bottom position; thus forming the suction stroke of plunger 40.

The contour of cam 31, however, is maintained at its maximum radius until after contour of cam 30 has returned to base circle 67. Thereafter contour of cam 31 likewise returns to base circle 67 in a smooth curve. Thus, regardless of the angular position of shaft 42, valve 45 will always be held open during the entire suction stroke of the fuel plunger and until plunger 40 has reached its bottom position.

It will also be noted that this design allows of a quick injection stroke (the injection stroke usually covering 40° of the crankshaft travel or 20° of the pump shaft travel); a slow suction stroke (thereby reducing the fluid friction through the inlet passages), and of a slow and smooth seating of valve 45.

By regulating stop 49 the point (time) of beginning of injection can be varied for both the main and auxiliary nozzles. By regulating shaft 42 the point (time) of the end of injection through the main nozzle may be varied. By regulating either of these controls the amount of full injection is controlled and varied; and by proper corresponding regulation of both the time of injection may be varied without varying the amount—without varying the period from start to finish of injection. Then, the proportionate amount of injection through the main and auxiliary nozzles may also be controllably varied by regulating stop 49, which regulates the distance the upper end of plunger 40 has to travel to cut off port 56. With a given disposition of port 56 and a given length of plunger 40, regulation of stop 49 automatically increases the proportion of fuel fed to the auxiliary nozzle just as the beginning of injection is advanced; and decreases the proportion as the injection beginning is retarded. But, by properly positioning port 56, or by making plunger 40 longer or shorter I get an independent control of the proportionate amount of fuel going to the main and auxiliary nozzles. This last may be done, for instance, by making the lower head 40ª of plunger 40 have a screw-threaded adjustability at 40ᵇ to lengthen or shorten the plunger.

Figure 12:
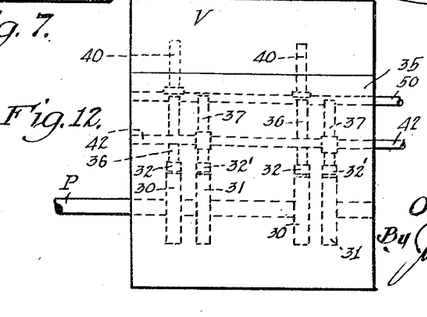
Fig. 12 is a diagrammatic view showing how the pump is applied to a multi-cylinder engine.

The pump shown here is for a one cylinder engine. A multi-cylinder pump can be readily produced by using housing 35, valve chest 46, and shafts P, 42 and 50, and fuel supply passage 60 in common for all pumps, but duplicating cams, cam followers, tappets, fuel plungers, fuel outlet valves, etc. for each pump. In such case adjustments 40ᵇ, 51 and 53 can be used to adjust the fuel pumps with reference to the engine timing and to each other; while the adjustments at 42 and 50 adjust all the pump mechanisms in common. Such an arrangement is indicated for a two cylinder engine in Fig. 12.

The manifold is shown as applied to a 2 cylinder engine; in Fig. 1 a section thereof is shown. The exhaust enters the manifold from cylinder passages 22′ and is conducted through branches 70ᵃ—70ᵃ to the exhaust pipe 70. These pipes 70 may or may not be water-jacketed.

The inlet air being inhaled during the suction stroke of the engine enters funnel shaped chamber 71 through control grates 72 and 72′ and from there is conducted through passages 22 and past inlet valve 9 into the cylinder proper. Grates 72 and 72′ are fitted with a series of slots 73 and 73′ for the purpose of muffling the noise of the suction. Grate 72 is rigidly fastened to the manifold, while grate 72′ can be slid endways by the operator. Moving grate 72′ in one direction its slots will register with the slots in grate 72, and the air passage will be unobstructed. This is the running position of the motor. Moving grate 72′ in the other direction, the slots in grates 72 and 72′ will fail to register and the passage of air past them will be partially or entirely obstructed. This is the starting position of the motor.

Where two or more cylinders are used, preferably only one inlet pocket is provided for each two cylinders as shown thereby admitting the use of much larger grates and a more simple construction.

Figs. 1 and 2 show a special cylinder head with overhead valves and with an integral retort K.

Figs. 8 and 9 show a variation thereof with a separate retort. The latter can also be used for engines operating under the Otto cycle by applying thereto a standard type of manifold and carbureter connecting with inlet 22 and fitting a spark plug into the retort K.

Cylinder head F carries within it passages 22 and 22′ which at one end terminate into the valve seats of valves 9 and 9′ and at the other end register with suitable openings in manifold G. Manifold G is held to the cylinder head by vertical studs or bolts similar to the fastenings usually employed for holding the cylinder head to the cylinder. The valves are held against their seat by the action of springs 10 in the usual manner. They are operated by rockers 8 oscillating around shaft 11 which is supported from the cylinder head by uprights 12. The head is cooled by cooling water in spaces 23. The cooling water enters from jacket spaces 23ᵃ of cylinder through holes 24 which register with similar holes in the cylinder head and leaves through opening 25 in the top of the head. It will be seen that pipes 22 and the valve seats are thoroughly cooled.

Valves 9 and 9′ are located to one side of the center line of the cylinder in order to allow nozzle passage 21 (in Fig. 1) or spark plug hole (in Fig. 8) to terminate at their lower end near the center of the cylinder, (the center of the cylinder head being commonly considered the most advantageous place for the location of the spark plug in the Otto cycle or the injection nozzle in the Diesel cycle).

In order to permit of the use of large valves, pockets 27 are provided in the upper part of cylinder E into which valves 9 and 9′ partly overhang. These pockets are such as to give a reasonably free passage of the gases past the valve seat. In case of breakage of the end of the valve stem (a frequent occurrence in practice), the valve by reason of its edge protruding into the pocket is prevented from dropping bodily into the cylinder and causing any damage therein.

The outlet openings of passages 22 and 22′ being in the same plane with the bottom of the cylinder head has the following advantages as contrasted with the usual method of attaching the manifold against the side of the cylinder head.

Simpler construction; only one surface has to be machined instead of two.

Easier alignment; in multi-cylinder engines using individual cylinders or cylinder heads, and using a side attached manifold, the cylinders, or the cylinder heads, must be aligned not only with respect to the base, but with respect to the manifold as well. While in this case alignment with the base is automatically, alignment with the manifold.

Readily removable cylinder heads; in multi-cylinder engines using separate cylinders or cylinder heads it frequently becomes necessary to remove one of them for inspection or repair. When using a side attached manifold, the whole manifold must be backed off, or removed entirely, before any one of the heads can be lifted without disturbing the manifold, the manifold being held in place by the remaining cylinder heads.

Figure 13:
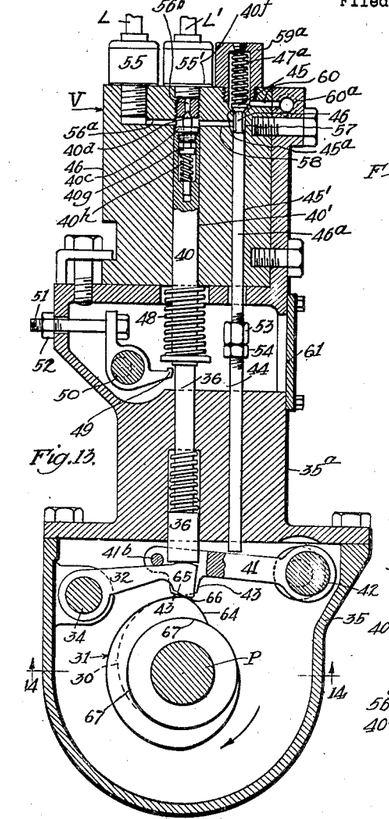
Fig. 13 is a view similar to Fig. 6 showing a modified form of fuel pump.
Figure 14:
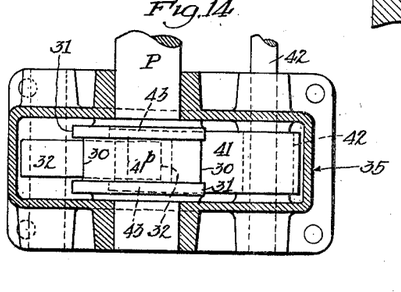
Fig. 14 is a section on line 14—14 of Fig. 13.
Figure 15:
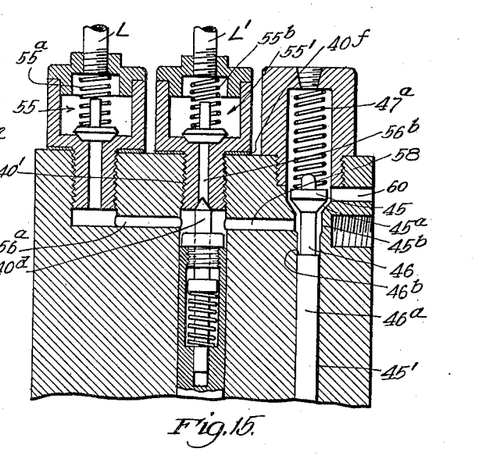
Fig. 15 is a sectional enlargement of certain parts shown in Fig. 13, and also showing a small variation.

In Figs. 13, 14 and 15 I have shown a preferred variational form of the fuel pump. The general arrangement and major features of action are the same here as in the form of pump before described; but there are certain amplifications of structure and certain other changes of structure that obtain a somewhat different action in detail. The shaft P carries a double cam 30—31 of approximately the same forms as heretofore described; and a follower 32 pivoted at 34 follows cam surface 30. The arm 41, pivoted on the eccentric shaft 42, has feet 43 that ride on cam surface 31; and the arm 41 also has a pin 41$^b$ that overlies follower 32 so that arm 41 is always raised with follower 32 as that follower is raised by the action of cam surface 64 on follower surfaces 65 and 66. But cam surface 31, being longer in returning to the base circle as hereinbefore described, lets the arm 41 down more slowly than cam follower 32 comes down, keeping the inlet valve open as the pump plunger comes down. Follower 32 bears directly on plunger 36 as in the form previously explained, and this plunger pushes upwardly on the lower end of pump plunger 40 which is moved down by spring 48. The arrangement at 49, 50, is substantially the same as hereinbefore described, for the purpose of limiting the downward movement of pump plunger 40 and thus adjustably fixing the position from which it begins its upward stroke. In the head of block V the fuel discharge passages are here shown in different positions from what they are in Fig. 6. The passage 56$^a$ that leads off laterally from pump cylinder 40' here leads to the check valve 55 that controls fuel to line L; while a passage 56$^b$ leads to check valve 55' that controls passage of fuel to line L' that goes to the retort nozzle. Passage 56$^b$ is preferably concentric with cylinder bore 40' and it has at its lower end a valve seat surface adapted to be closed by the small spring pressed valve 40$^d$ mounted in the upper end of plunger 40. This valve is normally held in its uppermost position in plunger 40 by a small spring 40$^h$, its upward movement being limited by shoulder 40$^g$ coming into contact with the lower surface of bushing 40$^c$. In Figs. 13 and 15, the plunger 40 is shown in its lifted position and the valve 40$^d$ is shown in position shutting off the passage 56$^b$. The point in the upward movement of plunger 40 at which valve 40$^d$ will close off passage 56$^b$ may be regulated either by such a device as is shown at 40$^b$ in Fig. 6; or by using valves 40$^d$ of different lengths or by putting gaskets 40$^f$ of different thicknesses under the body of check valve 55'.

The valve lifting arm 41 lifts on rod 44 that in turn lifts on valve stem 46$^a$, rod 44 being effectively adjustable in length by means of the nuts 53 and 54. This valve stem 46$^a$, playing in the bore 45', has a reduced upper end as at 46 carrying the inlet valve 45 that seats on valve seat 45$^a$. The inlet port 58 that leads from valve 45 to cylinder bore 40' is here shown communicating with valve bore 45 below valve 45 instead of above it as in Fig. 6; and the port 60 that leads fuel to valve 45 from the fuel pipe connection 60$^a$ is shown coming in above valve 45. Valve 45 is normally held down on its seat by spring 47$^a$ above it, and a removable housing 59$^a$ above the spring and valve allows access to the valve. With port 58 located beneath valve 45, the pressure raised on the fuel by the action of the pump does not tend to hold the valve down. This pressure, in the form now under discussion, exerts a downward pressure at the shoulder 46$^b$ on valve stem 46$^a$ and also a substantially equal pressure upwardly on that part of valve 45 that is within seat 45$^a$. The pressures being balanced, there is no extra pressure against which the valve lifting arm 41 has to act and the wear on the cams is thus reduced. If desired, the bore 45' may be somewhat increased in size at 45$^b$ directly under the valve seat 45$^a$, (see Fig. 15) thus to make the fluid pressure upward on the valve a little greater than the pressure downward on the shoulder 46$^b$. This excess of fluid pressure upward is not normally sufficient to raise the valve against the downward pressure of spring 47$^a$; but in case an excessive pressure is raised by the pump, due to clogging etc., the valve then acts as a safety valve to allow the excess pressure to redischarge back into the fuel line.

In operation, arm 41 will always move upwardly when cam follower 32 moves upwardly acted upon by cam surface 64. Thus, the plunger 40 and the valve stem will be raised by one and the same action; but the time at which the valve stem is raised will depend upon the adjustment of eccentric 42. This eccentric has a range of adjustment sufficient to raise and open valve 45 early enough for the least fuel supply—that is, to effect such an early opening of the valve during the pumping stroke of the plunger as to allow practically all, or even all, the fuel to return to the fuel supply pipe. In fact, the range of adjustment is such that valve 45 can be permanently held off its seat. On the other hand the range of adjustment by eccentric 42 is such that valve 45 does not open until plunger 40 has covered almost all its stroke—say about ¾ of its up-stroke. But it always opens before the completion of the pump plunger stroke. This arrangement insures at all times a sufficient opening of valve 45 to allow free passage of liquid back to the supply pipe and relieves the pressure of the cam follower on the cam at the point where face 64 and contour 31 meet, thereby reducing wear at that point of the cam that is most liable to wear.

In general, it will be seen that less work is imposed on the governing mechanism— the mechanism that lifts valve 45 during the up-stroke of pump plunger 40; and the result is better and more accurate governing action. It will also be noted that the valve seat or valve 45 is at the highest point in the liquid pressure system, and thus any air that may have entered the pump will collect there and will be blown out whenever the valve opens at the end of the injection stroke; and thus the pump is self priming.

The double injection system lends itself to a variety of fuel controls.

Thus the description that I have given so far has presumed that the springs, such as shown at 55$^a$ and 55$^b$ in Fig. 15, of check valves 55 and 55' are of about equal strength; and being thus of about equal strength the fluid flow will be divided more or less equally between lines L and L' up to the time that port 56 is covered by the plunger in the form shown in Fig. 6 or up to the time that valve 40$^d$ seats in the form shown in Fig. 13. This arrangement provides for the injection of a certain amount of fuel into the combustion chamber through line L at the same time that fuel is being injected into the retort through line L', and then provides for additional injection of fuel into the combustion chamber after combustion has commenced. In this way there occurs in the combustion chamber a certain amount of initial combustion at constant volume and then thereafter a combustion of the balance of the fuel at constant pressure.

But it may be desirable to eliminate the constant volume combustion either partially or entirely; and this can be done by placing a comparatively heavy spring in check valve 55 and a comparatively light spring in check valve 55'. The heavy spring is strong enough that check valve 55 will not open until after port 56 has been cut off in Fig. 6 or valve 40$^d$ has seated in Fig. 13; the entire amount of fuel up to that time going to the retort. Then after the retort has been cut off, the entire fuel displacement of the pump will go to the cylinder to be burned at constant pressure.

Or, it may be desirable in small high speed engines, where the time allowed for evaporation of the fuel supply is rather limited, and where the burning of a substantial part of the fuel is desired to be at constant volume, to change the arrangement so that line L' will connect with the main fuel nozzle into the combustion chamber and the line L with the nozzle injecting into the retort. In that case, using again a comparatively stiff spring in check valve 55, the fuel will first be injected into the compression and combustion space and allowed to vaporize and form an explosive mixture therein, previous to the injection of any fuel into the retort and previous to ignition resulting from injection of fuel into the retort. In this case the injection of fuel into the retort governs the time of ignition and the injection of the main fuel into the combustion space governs the strength of the explosion. In this particular case, like in the others, the amount of retort fuel can be maintained constant and the amount of the main fuel can be altered by altering the point of beginning of the fuel pumping by manipulation of eccentric shaft 50.

I have fully described how the pump mechanism, in either of its forms, can be adjusted to change the absolute amounts of fuel going either to the retort or to the combustion chamber, and also to change the proportion between these two amounts. In practice, it is of course, desirable, once the proper and effective amount of retort fuel is ascertained, to keep that amount of fuel constant or practically constant regardless of the output of the engine and to vary the combustion chamber injection in accordance with the required output. It needs no further explanation to show that the mechanisms I have here explained are perfectly capable of achieving this result. It is one of the excellencies of this arrangement that, regardless of the amount of combustion in the work cylinder proper, the amount of combustion in the retort is practically constant, variation in the amount of combustion in the combustion chamber having only a small secondary effect on the amount of combustion and heat developed in the retort. Therefore, the retort can be kept at practically constant temperature. The slight secondary effect of the combustion heat can be readily counterbalanced by slightly decreasing the amount of retort fuel at full load and slightly increasing it at light load, as has been shown in the description of the pump mechanism. This arrangement of two injection nozzles and controlling means to control the amount of fuel to those nozzles, overcomes one of the greatest difficulties experienced with engines that use one large retort pump and one nozzle; for in such engines on full load the retort tends to overheat, and causes preignition, while at light loads the retort tends to cool off to such an extent as to cause misfiring.

Figure 16:
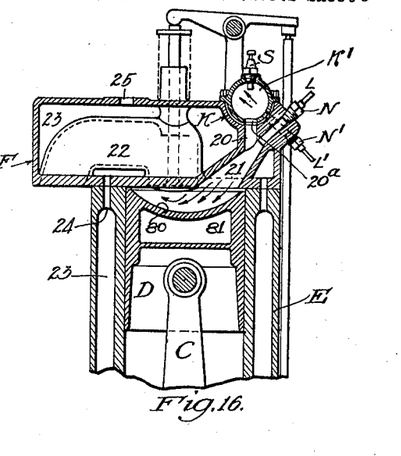
Fig. 16 is a view similar to Fig. 8 showing another modification of cylinder head and retort.

In Fig. 16 I have shown a preferred form of cylinder head variation, somewhat similar to that shown in Fig. 8, but using two nozzles like the form shown in Fig. 1. Here the retort K is shaped semi-spherically to hold a small spherical bulb K$^1$ that has an opening 20$^a$ in its lower side registering with passage 20 that leads to main nozzle passage 21. (The effective part of the bulb K$^1$ is its upper half as it is here the fuel strikes; and the lower half—the semi-spherical skirt—may be omitted if desired.) Spark plug S is located in the top of the hot wall K¹; and the retort injection nozzle N' is arranged, as shown in the drawings, so that its line of injection will not directly strike the spark plug but so that a sufficient amount of spray will hit it to cause sure ignition. Of course, it will be understood that here, as in the other forms described, ignition by contact of the fuel with the hot wall of the bulb K¹ may be relied upon, with or without the spark plug S. Also fuel nozzle N' is slightly offset sideways so as not to interfere with the main fuel nozzle N' which is located central with passage 21.

Both Figures 8 and 16 show the decidedly cupshaped piston with a separating wall 82 to keep the head at a fairly high and fairly constant temperature in order to promote rapid evaporation of the fuel, without, however, reaching so high a temperature as to cause auto-ignition. They show the conical passage 21 inclined to just an extent that in combination with the curvature of the piston top it will cause a uniform distribution of the fuel throughout the compression space. They also show the passage 20 so located that the flame from the retort will hit the lower side of channel 21 and ignite any drippings from nozzle N, and thus avoid any accumulation of unburnt fuel due to temporary poor condition of the nozzle, etc.

Having described a preferred form of my invention, I claim:

1. A fuel pump for an internal combustion engine, comprising a cylinder having two spaced apart outlet ports, a plunger in the cylinder and adapted to be moved to position to close one of said ports, means to controllably vary the total effective pumping stroke of the plunger; and means independent of the first means to controllably vary the proportion of such stroke necessary to close said one port.

2. A fuel pump for an internal combustion engine, comprising a cylinder having two spaced apart outlet ports, a plunger in the cylinder normally uncovering both of said ports, and means to give the plunger a variable stroke in the cylinder to cover one of said ports, said means comprising an operating mechanism having a constant stroke and adapted to push against the end of the plunger, and a controllable variable stop to limit movement of the plunger toward said mechanism.

3. A fuel pump for an internal combustion engine, comprising a cylinder having two spaced apart outlet ports, a plunger in the cylinder normally uncovering both of said ports, means to give the plunger a variable stroke in the cylinder to cover one of said ports, a relief valve in communication with the cylinder, and controllably variable means actuated in conjunction with the plunger stroke imparting means to open the relief valve.

4. A fuel pump for an internal combustion engine, comprising a cylinder having two spaced apart outlet ports, a plunger in the cylinder normally uncovering both of said ports, means to give the plunger a variable stroke in the cylinder to cover one of said ports, said means comprising an operating mechanism having a constant stroke and adapted to push against the end of the plunger and a controllable variable stop to limit movement of the plunger toward said mechanism, a relief valve in communication with the cylinder, and a controllably variable means actuated in conjunction with the plunger stroke imparting means to open the relief valve.

5. A fuel pump for an internal combustion engine, comprising a cylinder with an outlet port, a pump plunger in the cylinder, a cam shaft and a cam thereon to actuate the pump plunger through a constant stroke, a controllably variable stop to limit movement of the pump plunger toward the actuating cam, a relief valve in communication with the cylinder, a valve actuating cam on the cam shaft, a member actuated by the valve actuating cam and adapted to push upon the valve, and means to vary the effective length of said member so that it will strike and begin to move the valve at a controllably variable time.

6. A fuel pump for an internal combustion engine, comprising a cylinder having spaced apart outlet ports, an inlet and relief port communicating with the cylinder, a plunger in the cylinder, a spring urging the plunger outwardly, a variable stop against which the plunger rests and by which its outward stroke is limited, a cam shaft with cam thereon adapted to impart an inward movement to the plunger, an inlet and relief valve controlling the inlet and relief port, such valve being mounted on a stem and adapted to be opened by inward movement, a spring tending to normally seat the valve, a valve actuating cam on the cam shaft, a member actuated by the valve actuating cam and adapted to push upon the valve, and means to controllably vary the normal position of said member with reference to the valve so as to vary the time during its movement at which it strikes the valve.

7. A fuel pump for an internal combustion engine, comprising a cylinder with spaced apart outlet ports, an inlet and relief port communicating with the cylinder, a plunger in the cylinder, a spring urging the plunger outwardly, a variable stop against which the plunger rests and by which its outward stroke is limited, a cam shaft with cam thereon adapted to impart through a constant stroke an inward movement to the plunger, an inlet and relief valve controlling the inlet and relief port, such valve being mounted on a stem and adapted to be opened by inward movement, a spring tending to normally seat the valve, a valve actuating cam on the cam shaft, a member actuated through a substantially constant stroke by the valve actuating cam and adapted to push upon the valve, and means to controllably vary the normal position of said member with reference to the valve so as to vary the time during its movement at which it strikes the valve, the plunger actuating cam being shaped to impart an inward movement to the plunger and then allow its outward movement immediately thereafter, and the valve actuating cam being shaped to lift the valve and then hold the valve lifted during the whole of the outward movement of the pump plunger.

8. The combination as specified in claim 6, and means to adjust the normal relation between the plunger and one of said outlet ports adapted to be closed by the plunger.

9. In a fuel pump for a multi-cylinder engine, a pump mechanism for each engine cylinder embodying a pump cylinder and a plunger, common actuating means for all the plungers, means common to all the plungers for controllably varying in unison their points of start of pumping stroke, means individual to each plunger to control its point of start of pumping stroke independently of the other plungers, controllably variable means common to all the plungers to vary the point of end of their effective pumping strokes, and means individual to each plunger for doing the same independently of the others.

10. In a fuel pump for a multi-cylinder engine, a pump mechanism for each engine cylinder embodying a pump cylinder with plunger and relief valve, common actuating means for all of the plungers, common actuating means for all of the relief valves, an arrangement whereby the relief valves can be opened at variable points to terminate the pumping strokes of the plungers, means common to all of the plungers for controllably varying the effective pumping stroke, and means individual to each plunger to vary its effective pumping stroke independently of the other plungers.

In witness that I claim the foregoing I have hereunto subscribed my name this 14th day of February 1923.

OSCAR WERNER.